United States Patent

[11] 3,633,675

[72] Inventor Edwin W. Biederman, Jr.
    Hightstown, N.J.
[21] Appl. No. 98,058
[22] Filed Dec. 14, 1970
[45] Patented Jan. 11, 1972
[73] Assignee Cities Service Oil Company
    Tulsa, Okla.

[54] FIRE-RETARDANT FOAM COMPRISING MONTMORILLONITE CLAY FLOAT ASH AND PHOSPHATE ROCK
6 Claims, No Drawings

[52] U.S. Cl............................................... 169/1 A,
    106/15 FP, 117/138, 252/2, 252/8.1
[51] Int. Cl................................................. A62c 1/00,
    C09d 5/18, C09k 3/28
[50] Field of Search......................................... 117/138;
    169/1 A; 252/2, 3, 4, 5, 8.05, 8.1; 106/15 FP

[56] References Cited
UNITED STATES PATENTS

| | | | |
|---|---|---|---|
| 3,249,534 | 5/1966 | Ware............................. | 252/8.1 |
| 3,334,045 | 8/1967 | Nelson........................ | 252/2 |
| 3,372,040 | 3/1968 | Ware............................ | 106/15 |

FOREIGN PATENTS

| | | | |
|---|---|---|---|
| 737,419 | 6/1966 | Canada....................... | 117/138 |

Primary Examiner—John T. Goolkasian
Assistant Examiner—Robert A. Dawson
Attorney—J. Richard Geaman ABSTRACT: A foam is disclosed which may be sprayed on the side of structures to protect them from fire spread. The foam includes a water-saturated montmorillonite-type clay material as the basic vehicle to which is added float ash and fine-grained phosphate rock. The foam may be readily pumped onto the structure with subsequent dehydration of the montmorillonite-type clay material and insulation provided by the float ash, thereby retarding fire spread.

FIRE-RETARDANT FOAM COMPRISING MONTMORILLONITE CLAY FLOAT ASH AND PHOSPHATE ROCK

BACKGROUND OF THE INVENTION

The present invention relates to the retardation of fire damage. More particularly, the present invention involves the use of a water saturated montmorillonite-type clay material in conjunction with float ash and fine-grain phosphate rock in a foam for the prevention of damage to materials and to protect them from fire attack.

Large fires in buildings frequently spread rapidly to neighboring buildings, requiring inhibition of fire spread to minimize threat to both life and property. The art of fire-retardation has involved wetting down structures with streams of water from fire hoses. At present, manpower, hoses and water are diverted from the main fire extinguishment to protect neighboring buildings with this effort curtailing the resources that may be devoted to the controlling the blaze in the original structure. What is required is a material which may be easily placed upon structures to protect them from fire spread. The necessary requirements involve materials which will adhere to a vertical surface, insulate the underlying surface from the impending heat and not burn.

It is an object of the present invention to provide a fire-retardant material which may be easily placed on structures.

It is a further object of the present invention to provide a foam which may be sprayed on structures and thereby insulate the structures from further fire and heat damage.

It is still a further object of the present invention to provide a water-saturated montmorillonite-type clay material as a basic vehicle to which is added float ash and fine-grained phosphate rock for fire-retardation purposes.

With these and other objects in mind, the present invention may be more fully understood by referral to the following description.

SUMMARY OF THE INVENTION

The objects of the present invention are accomplished through the use of a composition of matter, particularly useful in fire retardation. The composition of matter consists essentially of montmorillonite clay, float ash and phosphate rock. The composition of matter of the present invention is primarily useful for the retardation of fire spread.

A process for retardation of fire spread is disclosed using the composition of matter described herein whereby a slurry of the composition of matter is formed. The flammable objects near a fire are sprayed with the slurry so as to protect them both through the insulation provided by the float ash and the bleeding effect of the water from the montmorillonite clay contained within the slurry.

DETAILED DESCRIPTION OF THE INVENTION

The present invention is a composition of matter and process for the protection of structures from fire spread. The composition of matter may be slurried with water and sprayed on the side of structures for fire protection. It has the necessary requirements for such a material in that it will adhere to vertical surfaces, insulate the underlying surface from high heat and will not burn.

Moisture content of fuels has been long recognized as a major influence on the ignition of materials and their ability to spread fire. Therefore, a material which initially has a high water content will retard flame spread and sometimes prohibit ignition for retardation of fires. The present invention involves the use of a montmorillonite-type clay material as a basic vehicle to which is added float ash and fine-grain phosphate rocks. The contributions of these materials are that montmorillonite clay in a hydrated form exhibits an outstanding structural feature in that is allows water to enter between the unit layers of the compound and therefore has a high hydroscopic volume. Upon heating, the water is released continuously to afford a cooling effect. The moisture content of these clays following addition of water is a key physical characteristic in the inhibition of fire spread by the composition of matter of the present invention.

As a surface covered with water-saturated montmorillonite clay is heated, dehydration occurs, water being formed on the outside of the surface and thereby preventing fire spread and retardation of further fire in the vicinity of the covered surface. Float ash, which consists of hollow spheres or cenospheres of silica-alumina composition, is included in the slurry to maintain waste space and provide the insulation characteristic of the fire-retardant foam while allowing the water content of the foam to be greatly reduced. It has been proven that float ash can survive very high temperatures which makes it an excellent insulating material. Float ash has the further advantage of being a lightweight, high-volume material which can be easily applied to surfaces in the composition disclosed herein. Fine-grain phosphate rock materials are incorporated for their flame-retardant characteristics. The phosphate enhances the thixotropic quality (the ability to become liquid upon stirring and solid upon standing) of the bentonite slurry, bentonite being the primary montmorillonite clay utilized in the compositional matter of the present invention.

The composition of the present invention is preferably prepared and stored in dry form and then slurried with water just prior to use. Slurries containing between about 40 and about 80 percent by weight of water are preferred. The water forms a slurry which is easily pumped to the surface to be protected and upon which it gels to effectively insulate and retard fires thereon. This latter feature allows the material to be pumped readily and yet also enables it to assume gel characteristics when it lands on the surface. If desired, however, the composition may be slurried in advance so as to be ready for immediate use.

A dry mixture of the fire retardant material of the present invention may constitute many compositions, the following examples illustrated in table 1 are but a few preferred mixes of these compositions:

TABLE 1

Compositions-Weight Percent

| Montmorillonite Clay | Phosphate Rock | Float Ash |
| --- | --- | --- |
| 10 | 30 | 60 |
| 10 | 60 | 30 |
| 30 | 10 | 60 |
| 30 | 60 | 10 |
| 60 | 30 | 10 |
| 60 | 10 | 30 |

These and other compositions may be slurried with water to form a fire retardant foam for protecting flammable objects.

The composition of the slurry that is utilized depends to some degree upon the storage time and the availability of pumping apparatus. Ideally, the slurry should be as viscous as the pump will allow so that the material will adhere to the surfaces to be protected. It would appear to be desirable to have at least about 20 lbs. of bentonite per barrel of fresh water to maintain a relatively high viscosity. Float ash tends to lighten the dewatered coating as well as producing insulating void space and can be added until the proper viscosity is reached. Normally, the composition of matter of the present invention will include the water in concentrations from about 10 to about 85 percent by weight of the total weight of the slurry. Montmorillonite clay, in which bentonite is normally used, is present in concentrations from about 5 to about 30 percent by weight. Float ash, which is obtainable from coal-fired power plants, may be utilized in a concentration of from about 5 to about 30 percent by weight with fine-grained phosphate rock comprising the rest of the composition in concentrations of from about 5 to about 30 percent by weight.

The typical compositions of the slurry which may be utilized in the present invention are given in the following examples:

EXAMPLE 1

A fire-retardant slurry material may be provided by mixing in a barrel of water a composition as shown in table 2. The mixture may be slurried through use of a particle distribution pump and drum assembly whereby the solution and slurry is produced in a drum. The ingredients may be added to the top of the drum and the particle-distribution pump placed at the lower portion of the drum with an exit into the top of the drum such that continuous recirculation of the contents of the drum is provided. The slurry viscosity may be adjusted by the addition of float ash until the proper viscosity or pumpability and surface tension or ability to stick to surfaces is obtained. The resulting material will give an excellent bleeding of water and dehydration of the bentonite as heat is placed upon it, will adhere to surfaces and will provide excellent insulating material on the surface being protected.

TABLE 2

| Material | Weight % |
| --- | --- |
| Montmorillonite Clay (Bentonite) | 15 |
| Phosphate Rock | 10 |
| Float Ash | 10 |
| Water | 65 |
| Total | 100 |

EXAMPLE 2

Another composition of matter for the retardation of fires may be prepared with similar apparatus as described in example 1 with the composition of the slurry being depicted in table 3. Once again, float ash is added until the proper viscosity is found in the drum. Material is then pumped onto the structural feature to provide the required dehydration of water from the slurried material upon intervention of heat and insulation of the structure by the presence of float ash with a phosphate enhancing the thixotropic quality of the bentonite slurry. Through use of these and other compositions, the fire-retardant foams of the present invention may be prepared and utilized in fire prevention.

TABLE 3

| Material | Weight % |
| --- | --- |
| Montmorillonite Clay (Bentonite) | 15 |
| Phosphate Rock | 5 |
| Float Ash | 20 |
| Water | 60 |
| Total | 100 |

Other embodiments of the present invention may replace the high water montmorillonite-type clay materials with polymeric thickeners, for example carboxymethylcellulose. Polyethyleneoxide may also be utilized to increase the flow rates and as beads may be introduced in replacement of the float ash material for insulating material. Many phosphate-type materials may be substituted for the fine-grain phosphate rock without departing from the invention and may be used in either purified or naturally found form to give the thixotropic characteristics desirable with the clay and float ash materials. It is particularly advantageous, however, to use the high water clays, float ash and fine-grain phosphate rock as disclosed herein because of the relatively low cost and availability for use in any vicinity and for immediate production of the slurry material.

The composition of matter described herein may be utilized in a process for the retardation of fire spread by forming a slurry of water, montmorillonite clay, float ash and phosphate rock. This foam is sprayed upon flammable objects in the vicinity of fire. Typical fire prevention apparatus has a normal complement of hose assemblies and tank trucks which may be utilized to form the slurry as disclosed herein and to provide the spray apparatus for coating the flammable structures therewith. Clearly, by use of the composition of matter and the process described herein, the inhibition of fire spread can be extremely curtailed through control of the blaze in the original structure under fire, while protecting the neighboring buildings in an effort to cut down on the resources that must be devoted to fire prevention.

The present invention has been described herein with respect to certain embodiments thereof. It will be appreciated by those skilled in the art, however, that various changes and modifications can be made without departing from the spirit and scope of the invention as set forth.

Therefore, I claim:
1. A composition of matter, particularly useful in the fire retardation, consisting essentially of:
   a. montmorillonite clay;
   b. float ash; and
   c. phosphate rock.
2. The composition of claim 1 in which:
   a. the montmorillonite clay is in a concentration of from about 10 to about 60 percent by weight;
   b. the float ash is in a concentration of from about 10 to about 60 percent by weight; and
   c. the phosphate rock is in a concentration of from about 10 to about 60 percent by weight.
3. A composition of matter, particularly useful in the fire retardation, consisting essential of a slurry of:
   a. water;
   b. montmorillonite clay;
   c. float ash; and
   d. phosphate rock.
4. The composition of claim 3 in which the water is in a concentration of from about 10 to about 85 percent by weight.
5. A process for retarding fire spread comprising:
   a. forming a slurry of water, montmorillonite clay float ash and phosphate rock; and
   b. spraying flammable objects in the vicinity of the fire with the slurry.
6. The process of claim 5 in which the slurry has a composition of:
   a. from about 10 to about 85 percent by weight of water;
   b. from about 5 to about 30 percent by weight montmorillonite clay;
   c. from about 5 to about 30 percent by weight float ash; and
   d. from about 5 to about 30 percent by weight phosphate rock.

* * * * *